No. 799,735. PATENTED SEPT. 19, 1905.
F. HOSKOVEC & J. J. ROUBAL.
CORN CULTIVATOR.
APPLICATION FILED SEPT. 6, 1904.
2 SHEETS—SHEET 1.
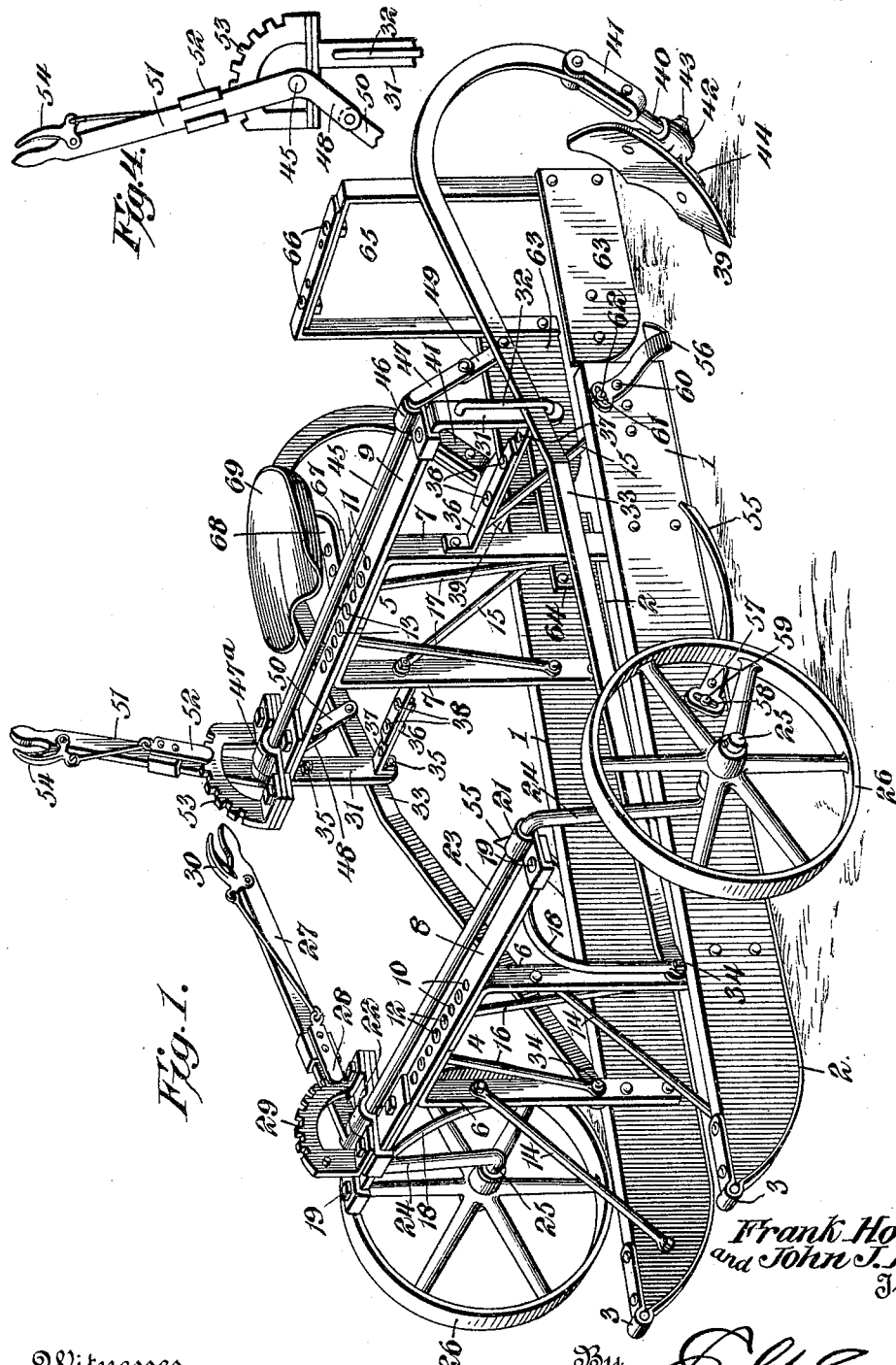

No. 799,735. PATENTED SEPT. 19, 1905.
F. HOSKOVEC & J. J. ROUBAL.
CORN CULTIVATOR.
APPLICATION FILED SEPT. 6, 1904.
2 SHEETS—SHEET 2.
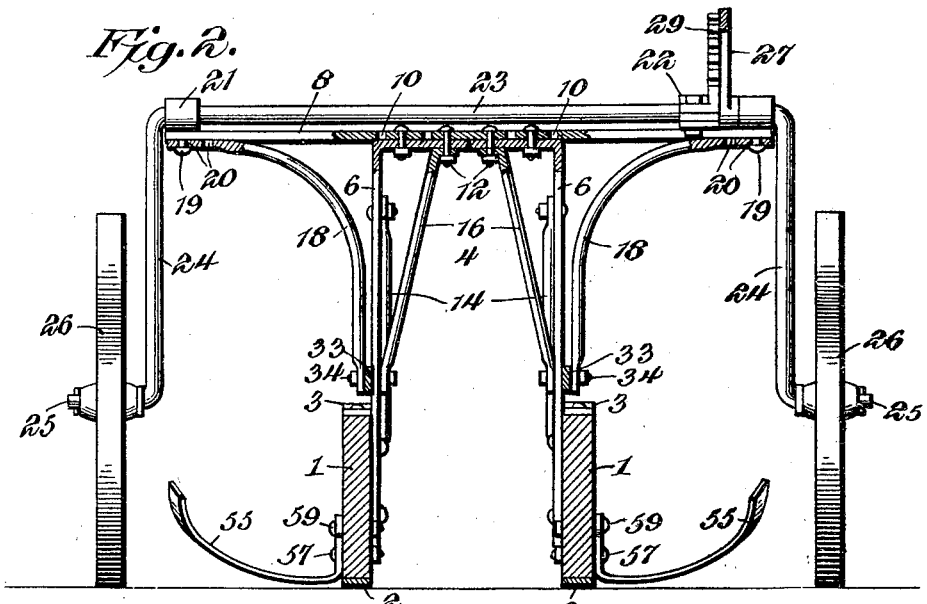
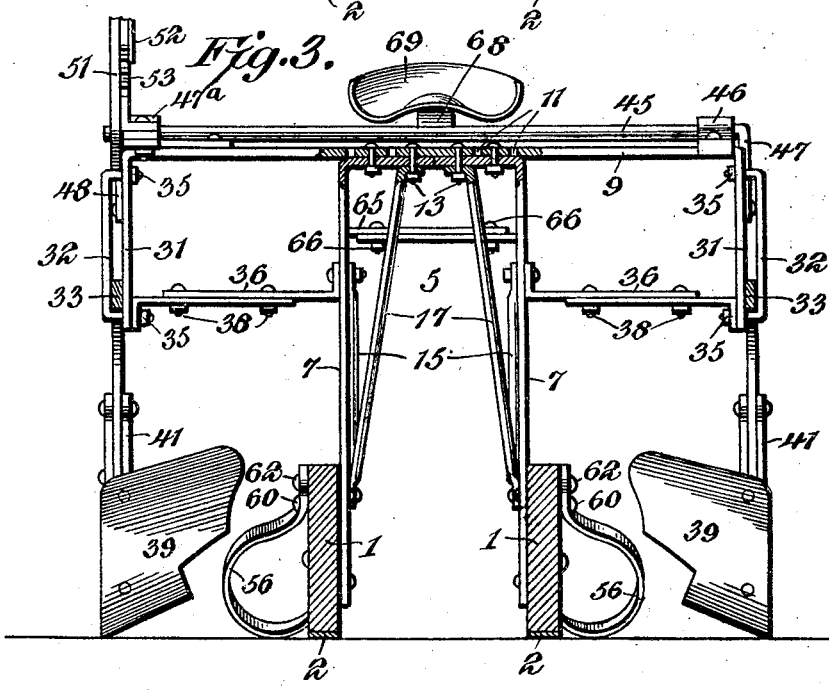
Frank Hoskovec and John J. Roubal, Inventors
Witnesses
By E. G. Siggers, Attorney

UNITED STATES PATENT OFFICE.

FRANK HOSKOVEC AND JOHN J. ROUBAL, OF BRUNO, NEBRASKA.

CORN-CULTIVATOR.

No. 799,735.  Specification of Letters Patent.  Patented Sept. 19, 1905.

Application filed September 6, 1904. Serial No. 223,567.

*To all whom it may concern:*

Be it known that we, FRANK HOSKOVEC and JOHN J. ROUBAL, citizens of the United States, residing at Bruno, in the county of Butler and State of Nebraska, have invented new and useful Improvements in Corn-Cultivators, of which the following is a specification.

The invention relates to improvements in cultivators.

The object of the present invention is to improve the construction of cultivators and to provide a simple, efficient, and comparatively inexpensive construction designed for cultivating corn and capable of adjustment to suit the width of the rows and adapted to cut down the growth of weeds in the furrow and on the sides of the rows.

A further object of the invention is to provide a corn-cultivator of this character which will not become clogged with weeds and which may be readily arranged to run either deep or shallow.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a corn-cultivator constructed in accordance with this invention. Fig. 2 is a transverse sectional view illustrating the construction of the front arch and the manner of mounting the arched or crank axle. Fig. 3 is a similar view illustrating the construction of the rear arch and the manner of mounting the rock-shaft for adjusting the plow-beams. Fig. 4 is a detail view illustrating the construction for adjusting the rock-shaft.

Like numerals of reference designate corresponding parts in all the figures of the drawings.

1 1 designate a pair of longitudinal runners adapted to straddle a row of corn and provided at their lower edges with metal shoes 2, the front portions of which are bent to form eyes 3 for the connection of a suitable draft attachment. The runners are connected by front and rear arches 4 and 5, composed of adjustable sections 6 and 7 and secured to front and rear cross-bars 8 and 9. The sections 6 and 7, which are L-shaped, have vertical and horizontal portions, the vertical portions being secured to the inner faces of the runners and the horizontal portions being located at the lower faces of the cross-bars 8 and 9. The cross-bars 8 and 9 are provided with perforations 10 and 11 for the reception of bolts 12 and 13 or other suitable fastening devices for securing the sections of the arches to the front and rear cross-bars. The runners are shown in the accompanying drawings at the limit of their inward adjustment, and they are capable of being moved outwardly from each other to accommodate the cultivator to a wider row. The arches are supported by front and rear longitudinally-disposed inclined braces 14 and 15, consisting of rods bolted to the runners and to the upright portions of the arches 4 and 5. The arches are also supported by inner transversely-disposed inclined bracing-rods 16 and 17, extending from the upright portions of the arches to the horizontal portions thereof, as clearly shown in Figs. 2 and 3 of the drawings.

The front cross-bar is extended laterally beyond the front arch, and the extended portions are supported by outer inclined bracing-rods 18, curved, as shown in Fig. 2, and secured at their upper ends to the cross-bar 8 by bolts 19, a plurality of perforations 20 being provided to permit the braces 18 to be adjusted with the arches. The extended portions of the front cross-bar are provided with suitable bearings 21 and 22 for the reception of an arched or crank axle consisting of an intermediate portion 23 and depending arms 24. The intermediate portion 23 is arranged in the bearings 21 and 22, and the depending arms are provided with outwardly-extending spindles 25, on which are arranged wheels 26. The wheels are adapted to run on the opposite rows, and they serve to stiffen the machine and to regulate the same. By arranging the wheels to run upon the tops of the rows the machine is rendered steady, and the adjustment of the wheels is effected by means of a lever 27, fixed to the arched or crank axle and near one end of the intermediate portion and provided with a detent 28, arranged to engage a quadrant-shaped ratchet 29. The quadrant-shaped ratchet 29 is mounted on the bearing 22, which is extended, as shown, and the lever 27 is provided with a latch-lever 30, connected with the detent and arranged adjacent to the handle of the operating-lever. The detent is slidably mounted on the lever 27, and the latch-lever, which is engaged by a spring in the usual manner, is adapted to be grasped simultaneously with the handle of the lever 27 when it is desired to adjust the arched or crank axle.

The rear cross-bar is extended laterally beyond the rear arch and is provided with depending arms or portions 31, having loops 32, and forming vertical guides for plow-beams 33. The plow-beams, which consist of metal bars, have parallel rear portions which are arranged in the guides, and their front portions converge from the guides to the front arches and are pivoted to the sides thereof by bolts 34, which also serve to secure the lower ends of the outer braces 18 to the front arch. The loops 32 consist of rods having their terminals bent at right angles and threaded, the threaded portions piercing the arms 31 and receiving nuts 35, which are located at the inner faces of the arms. The arms 31 are supported by outer transverse braces 36, extending from the sides of the rear arch of the arms 31 and secured to the same. The horizontal braces are composed of adjustable sections which are adapted to permit the adjustment of the arch 5. The sections of the horizontal braces are overlapped and provided with perforations 37 for the reception of bolts 38, which secure the sections in their adjustment.

The rear portions of the plow-beams are curved downwardly and forwardly, and plowshares 39 are connected with the beams by means of stems 40, having forked or bifurcated upper portions 41. The forked or bifurcated portions 41, which receive the lower ends of the rear portions of the plow-beams, are riveted or otherwise secured to the same, and the plowshares are provided with sockets or sleeves 42, which are secured on the stems by set-screws 43. The sockets or sleeves are provided with attachment plates or flanges 44, which are secured to the rear faces of the plowshares. The plowshares are adapted to throw the soil toward the row which is straddled by the runners. The stem 40, which is round, permits the socket or sleeve, which is provided with a circular opening, to be adjusted so as to set the plowshares at the desired angle.

The plow-beams are adjusted to cause the plowshares to run at the desired depth by means of a transverse rock-shaft 45, journaled in suitable bearings 46 and 47ª of the rear cross-bars and provided at its ends with arms 47 and 48, which are connected by links 49 and 50 with the plow-beams. When the rock-shaft is partially rotated, the arms 47 and 48 will be oscillated and will raise or lower the pivoted plow-beams. The arm 48 is formed integral with an operating-lever 51, which extends upward from the rock-shaft at one side of the cultivator and which is provided with a sliding detent 52 for engaging a quadrant-shaped ratchet 53. The quadrant-shaped ratchet 53 is mounted on the bearing 47ª, and the detent 52 is connected with a latch-lever 54, arranged adjacent to the handle of the operating lever or arm 51.

The cultivator is provided with front and rear knives 55 and 56 for cutting down the growth of weeds in the furrow and on the sides of the rows. The front knives, which are curved and partially twisted, extend outwardly and rearwardly from the runners and are pivoted near their front ends by bolts 57 or other suitable fastening devices. The front ends of the knives 55 are provided with slots 58, in which are arranged bolts 59 for securing the knives in their adjustment. The rear knives are similarly adjusted and are curved downwardly and outwardly, and the lower portions are curved inwardly, as clearly shown in Fig. 3 of the drawings. The rear knives are pivoted by bolts 60, located near the upper ends of the knives 56, and the latter are also provided with slots 61, which receive bolts 62 for securing the rear knives in their adjustment.

The cultivator is provided in rear of the runners with guards 63, constructed of sheet metal or other suitable material and having rounded front ends and adapted to prevent plants from being injured by the soil thrown toward them by the plows. The front ends of the guards are connected with the runners by horizontal bars or strips 64, secured to the inner faces of the runners and the guards. The rear ends of the guards are adjustably connected by an arched brace 65, composed of substantially L-shaped sections provided with upright side portions and having inwardly-extending overlapped horizontal connecting portions. The horizontal connecting portions are provided with perforations for the reception of bolts 66, which secure the arched brace in this adjustment.

The rear cross-bar is provided with a centrally-arranged rearwardly-projecting arm 67, to which is secured a spring 68 of a seat 69, which is provided for the accommodation of the driver.

Having thus fully described our invention, what we claim as new, and desire to secure by Letters Patent, is—

1. In a cultivator, the combination with runners, of an arch connecting the runners and having a cross-bar mounted on the arch and extending laterally therefrom to points beyond the runners, an arched or crank axle located above the arch and journaled on the extended portions of the cross-bar and provided with wheels at its ends, and means for partially rotating the axle.

2. In a cultivator, the combination of runners, a cross-bar provided with bearings, an arch composed of sections adjustably secured to the cross-bar, an arched or crank axle provided at its ends with wheels and having its intermediate portion arranged in the said bearings, and means for partially rotating the axle and for securing the same in its adjustment.

3. In a cultivator, the combination of runners, front and rear arches connecting the runners, the rear arches being provided with guides, plow-beams arranged in the guides of the rear arch and pivoted at the front arch, and a rock-shaft mounted on the rear arch and connected with the plow-beams for raising and lowering the same.

4. In a cultivator, the combination of runners, pivoted plow-beams, an arch connecting the runners, a cross-bar mounted on the arch, a rock-shaft mounted on the cross-bar and connected with the plow-beams, and means for partially rotating the rock-shaft and for securing the same in its adjustment.

5. In a cultivator, the combination of runners, an arch connecting the runners, a rock-shaft supported by the arch and provided with arms, links connecting the arms with the plow-beams, and means for partially rotating the rock-shaft and for securing the same in its adjustment.

6. In a cultivator, the combination of runners, an arch connecting the runners, a cross-bar supported by the arch and provided beyond the same with depending guides, pivoted plow-beams arranged in the guides, a rock-shaft mounted on the cross-bar and provided with arms connected with the runners, and means for partially rotating the rock-shaft and for securing the same in its adjustment.

7. In a cultivator, the combination of runners, an arch composed of sections, a cross-bar supported by the arch and adjustably secured to the sections and provided with depending guides, adjustable braces extending from the sides of the arch to the guides, plow-beams operating in the guides, and a rock-shaft supported by the cross-bar and having arms connected with the plow-beams.

8. In a cultivator, the combination of adjustable runners, guards located in rear of and connected with the runners, and an arched brace connecting the guards and composed of adjustable sections whereby the guards are adapted to be adjusted toward and from each other.

9. In a cultivator, the combination of adjustable runners, guards extending rearward from the runners and connected with the same, and means for adjustably connecting the guards with each other.

10. In a cultivator, the combination of runners, an arched or crank axle connected with the runners and provided with wheels, means for partially rotating the axle for securing the same in its adjustment, plows, spaced guards located between the plows and knives pivotally mounted on the runners and adjustably secured to the same.

11. In a cultivator, the combination of runners, plows, and blades adjustably mounted on the outer faces of the runners near the rear ends thereof and extending in rear of the runners.

12. In a cultivator, the combination of runners, an arch connecting the runners and provided with guides, pivotally-mounted plow-beams extending through the guides, and means for adjusting the plow-beams.

13. In a cultivator, the combination of runners, an arch connecting the runners and provided with laterally-projecting portions having depending guides, pivotally-mounted plow-beams extending through the guides, and means for adjusting the plow-beams.

14. In a cultivator, the combination of runners, an arch composed of sections, a cross-bar supported by the arch and adjustably secured to the sections and provided with depending terminal guides, adjustable braces extending from the sides of the arch to the guide, plow-beams operating in the guides, and means for adjusting the plow-beams.

15. In a cultivator, the combination of laterally-adjustable runners, plows pivotally connected with the runners and having their shares located at the rear ends of the same, means for moving the plows upward and downward, and guards extending rearward from the runners and arranged between the plows, said guards being adjustable laterally of the cultivator.

FRANK HOSKOVEC.
JOHN J. ROUBAL.

Witnesses:
FRANK J. KASPAR,
FRANZ SWOBODA, Jr.,
HANS J. WINTHERLICH.